United States Patent
Siew (10) Patent No.: US 8,442,162 B2
(45) Date of Patent: May 14, 2013

(54) METHOD FOR QR-MLD DEMODULATION

(75) Inventor: Jiun Siew, Victoria (AU)

(73) Assignee: NEC Corporation, Tokyo (JP)

( * ) Notice: Subject to any disclaimer, the term of this patent is extended or adjusted under 35 U.S.C. 154(b) by 28 days.

(21) Appl. No.: 13/128,150

(22) PCT Filed: Oct. 27, 2009

(86) PCT No.: PCT/JP2009/068742
§ 371 (c)(1),
(2), (4) Date: Jul. 19, 2011

(87) PCT Pub. No.: WO2010/055786
PCT Pub. Date: May 20, 2010

(65) Prior Publication Data
US 2011/0268231 A1    Nov. 3, 2011

(30) Foreign Application Priority Data

Nov. 12, 2008   (AU) ............................... 2008905827

(51) Int. Cl.
*H04L 27/06*    (2006.01)
(52) U.S. Cl.
USPC ........... 375/340; 375/267; 375/260; 375/341; 375/262; 375/347; 375/349
(58) Field of Classification Search .................. 375/267, 375/340, 341, 262, 260, 347, 349
See application file for complete search history.

(56) References Cited

U.S. PATENT DOCUMENTS

2005/0249302 A1*  11/2005  Leshem et al. ................ 375/267
2005/0259771 A1*  11/2005  Higuchi et al. ............... 375/347

FOREIGN PATENT DOCUMENTS

| JP | 2008-124843 A | 5/2008 |
|---|---|---|
| WO | 2006/055241 A2 | 5/2006 |

OTHER PUBLICATIONS

Wu, et al., "Low-Complexity Optimal Detection for Hybrid Space-Time Block Coding and Spatial Multiplexing," Vehicular Technology Conference, VTC-2006 Fall, IEEE 64th, Sep. 28, 2006, pp. 1-4.
Lee, et al., "Efficient Design of Symbol Detector for MIMO-OFDM Based Wireless LANs," Telecommunications and Malaysia International Conference on Communications, 2007 (ICT-MICC 2007), IEEE International Conference on, May 17, 2007, pp. 510-514.

(Continued)

*Primary Examiner* — Daniel Washburn
*Assistant Examiner* — Rahel Guarino
(74) *Attorney, Agent, or Firm* — Sughrue Mion, PLLC (57) ABSTRACT

A method for QR-maximum likelihood detection (QR-MLD) demodulation is provided. The method includes determining a transmission reception mode, receiving symbols represented by a received symbol vector, generating a channel matrix, and performing QR decomposition on the channel matrix to compute a unitary matrix and an upper triangular matrix. The method further includes the steps of processing the received symbol vector by multiplying the received symbol vector by the Hermitian of the unitary matrix, determining whether a conjugate calculation will be required to set a conjugate flag, computing a first distance metric by performing a conjugate or non-conjugate first distance metric calculation depending on the conjugate flag, and computing an estimated symbol by performing a conjugate or non-conjugate estimated symbol calculation depending on the conjugate flag. The method provided is less complex than existing demodulation methods, and it may be used to at least demodulate data transmitted via different modes.

12 Claims, 3 Drawing Sheets

OTHER PUBLICATIONS

Femenias, et al., "Coded Performance for Combined Spatial Multiplexing/Space-time Block Coding Wireless System," Smart Antennas, 2008 (WSA 2008), International ITG Workshop on, Feb. 27, 2008, pp. 332-337.

Alamouti, et al., A simple Transmit Diversity Technique for Wireless Communications, Selected Areas in Communications, IEEE Journal on Select Areas in Communications, Oct. 1998, pp. 1451-1458, vol. 16., No. 8.

* cited by examiner

METHOD FOR QR-MLD DEMODULATION

CROSS REFERENCE TO RELATED APPLICATIONS

This application is a National Stage of International Application No. PCT/JP2009/068742 filed Oct. 27, 2009, claiming priority based on Australian Patent Application No. 2008905827, filed Nov. 12, 2008, the contents of all of which are incorporated herein by reference in their entirety.

INCORPORATION BY REFERENCE

This application is based upon and claims the benefit of priority from Australian Provisional Patent Application No. 2008905827, filed Nov. 12, 2008, the disclosure of which is incorporated herein in its entirety by reference.

TECHNICAL FIELD

The present invention relates to wireless communications systems, and more particularly to a method for demodulating data transmitted over a wireless communications systems.

BACKGROUND ART

In wireless communications, techniques exist to improve spectral efficiency. For example, receivers are provided with hardware which carry out techniques such as QR demodulation, or MLD (maximum likelihood detection). However, many of these receivers are complex.

Further, present receivers in wireless communication systems need to be able to demodulate transmitted data with a variety of different methods. For example, in current LTE (Long Term Evolution) systems, a receiver must be able to demodulate data from a number of modes, for example: 2 transmit-2 receive antenna (2×2) multiple input-multiple output (MIMO) systems; 1×1 single input-single output (SISO) systems; 1×2 receive diversity (Rx diversity) systems; 2×1 or 4×1 space frequency block codes (SFBC); 4×2 or 4×2 SFBC; and 4×2 or 2×2 spatial multiplexing (MIMO).

A receiver which can accommodate all of the above modes is complex to implement in hardware and results in a large chip size.

It would therefore be desirable to provide a method of demodulating transmitted data which can demodulate data transmitted via a number of different modes but is less complex than existing demodulation methods.

It will be appreciated that a reference herein to any matter which is given as prior art is not to be taken as an admission that that matter was, in Australia or elsewhere, known or that the information it contains was part of the common general knowledge as at the priority date of the claims forming part of this specification.

DISCLOSURE OF INVENTION

With this in mind, one aspect of the present invention provides a method for QR-MLD demodulation, including the steps of:

(a) determining a transmission reception mode as being one of SISO, SIMO, MIMO or SFBC;

(b) receiving symbols simultaneously via multiple streams, the simultaneously received symbols being represented by a received symbol vector y;

(c) generating a channel matrix H;

(d) performing QR decomposition on the channel matrix H to compute a Q matrix and an R matrix such that H=QR, the Q matrix being a unitary matrix and the R matrix being an upper triangular matrix;

(e) processing the received symbol vector y by multiplying the received symbol vector y by the Hermitian $Q^H$ of the Q matrix such that $z=Q^H y$ where z is the processed received symbol vector;

(f) determining, for a SFBC mode determined at step (a), whether a conjugate calculation will be required and setting a conjugate flag having either a true or false value;

(g) computing a first distance metric $d_{1,j}$ by using the processed received symbol vector z and the R matrix of the QR decomposition and performing a conjugate first distance metric calculation if the conjugate flag is true, else performing a non-conjugate first distance metric calculation if the conjugate flag is false;

(h) computing an estimated symbol $\hat{x}_j$ by performing a conjugate estimated symbol calculation if the conjugate flag is true, else performing a non-conjugate estimated symbol calculation if the conjugate flag is false;

(i) mapping the estimated symbol to a constellation as $\hat{x}_{map,j}$;

(j) computing a second distance metric $d_{2,j}$ by performing a conjugate second distance metric calculation if the conjugate flag is true; else performing a non-conjugate second distance metric calculation if the conjugate flag is false;

(k) computing a total distance metric $d_{total,j}$ by summing the first and second distance metrics in steps (g) and (j); and (l) calculating the soft bits.

Advantageously, determining the transmission reception mode at step (a) allows for the method of the present invention to have the same steps for all transmission reception modes. Advantageously, this results in a less complex QR-MLD demodulator.

In a further advantage, steps (h) and (i) are a simplification of existing full maximum likelihood detection methods (where two distances are calculated for every possible transmitted symbol combination leading to a prohibitive number of computations). Steps (h) and (i) reduce the number of possible combinations that are considered by estimating the most likely symbol transmitted on an adjacent antenna.

Preferably, at step (f), the SFBC mode includes a frequency tone index $f=(0, f_{max})$ ranging from 0 to $f_{max}$ and the conjugate flag is determined by the expression $f=(0, f_{max})$ such that the conjugate flag is set to true if f is odd and set to false otherwise.

Preferably, at step (g) the conjugate first distance metric calculation is calculated from the expression $d_{1,j}=|z_2-r_{2,2}c_j^*|^2$ where $c_j$ is a symbol drawn from a constellation set.

Alternatively, at step (g) the non-conjugate first distance metric calculation is calculated from the expression $d_{1,j}=|z_2-r_{2,2}c_j|^2$ where $c_j$ is a symbol drawn from a constellation set.

The constellation set may include any constellation set commonly used in wireless communications, including BPSK, QPSK, 8-PSK, 16QAM, 64QAM.

Preferably, at step (h) the conjugate estimated symbol calculation is calculated from the expression $$\hat{x}_j = \frac{z_1 - r_{1,2}c_j^*}{r_{1,1}}.$$

Alternatively, at step (h) the non-conjugate estimated symbol calculation is calculated from the expression $$\hat{x}_j = \frac{z_1 - r_{1,2}c_j}{r_{1,1}}.$$

Preferably, at step (j) the conjugate second distance metric calculation is calculated from the expression $d_{2,j} = |z_1 - r_{1,1}\hat{x}_{map,j} - r_{1,2}c_j^*|^2$.

Alternatively, at step (j) the non-conjugate second distance metric calculation is calculated from the expression $d_{2,j} = |z_1 - r_{1,1}\hat{x}_{map,j} - r_{1,2}c_j|^2$.

Preferably, at step (k) the total distance metric $d_{totalj}$ is calculated by the expression $d_{totalj} = d_{1,j} + d_{2,j}$.

Preferably, at step (l), the soft bits are calculated by:

(m) calculating the minimum distance from the symbols in the constellation that have a 1 in the i-th bit position (denoted $B_i^1$) from the expression $$d_{min,i}(B_i^1) = \min_{j \in B_i^1}(d_{total\,j});$$

(n) calculating the minimum distance from the symbols in the constellation that have an 0 in the i-th bit position (denoted $B_i^0$) from the expression $$d_{min,i}(B_i^0) = \min_{j \in B_i^0}(d_{total\,j}); \text{ and}$$

(o) calculating the two minimum distances from the expression $$\hat{b}_i = d_{min,i}(B_i^1) - d_{min,i}(B_i^0).$$

Advantageously, all modes can be processed using the same method, save for determining whether a conjugate calculation need be computed or not, which thereby reduces hardware implementation complexity. In a further advantage, this reduced hardware implementation complexity may afford a reduction in chip size.

BRIEF DESCRIPTION OF THE DRAWINGS

The following description refers in more detail to the various features and steps of the present invention. To facilitate an understanding of the invention, reference is made in the description to the accompanying drawings where the invention is illustrated in a preferred embodiment. It is to be understood however that the invention is not limited to the preferred embodiment illustrated in the drawings.

In the drawings.

BEST MODE FOR CARRYING OUT THE INVENTION

Figure 1:
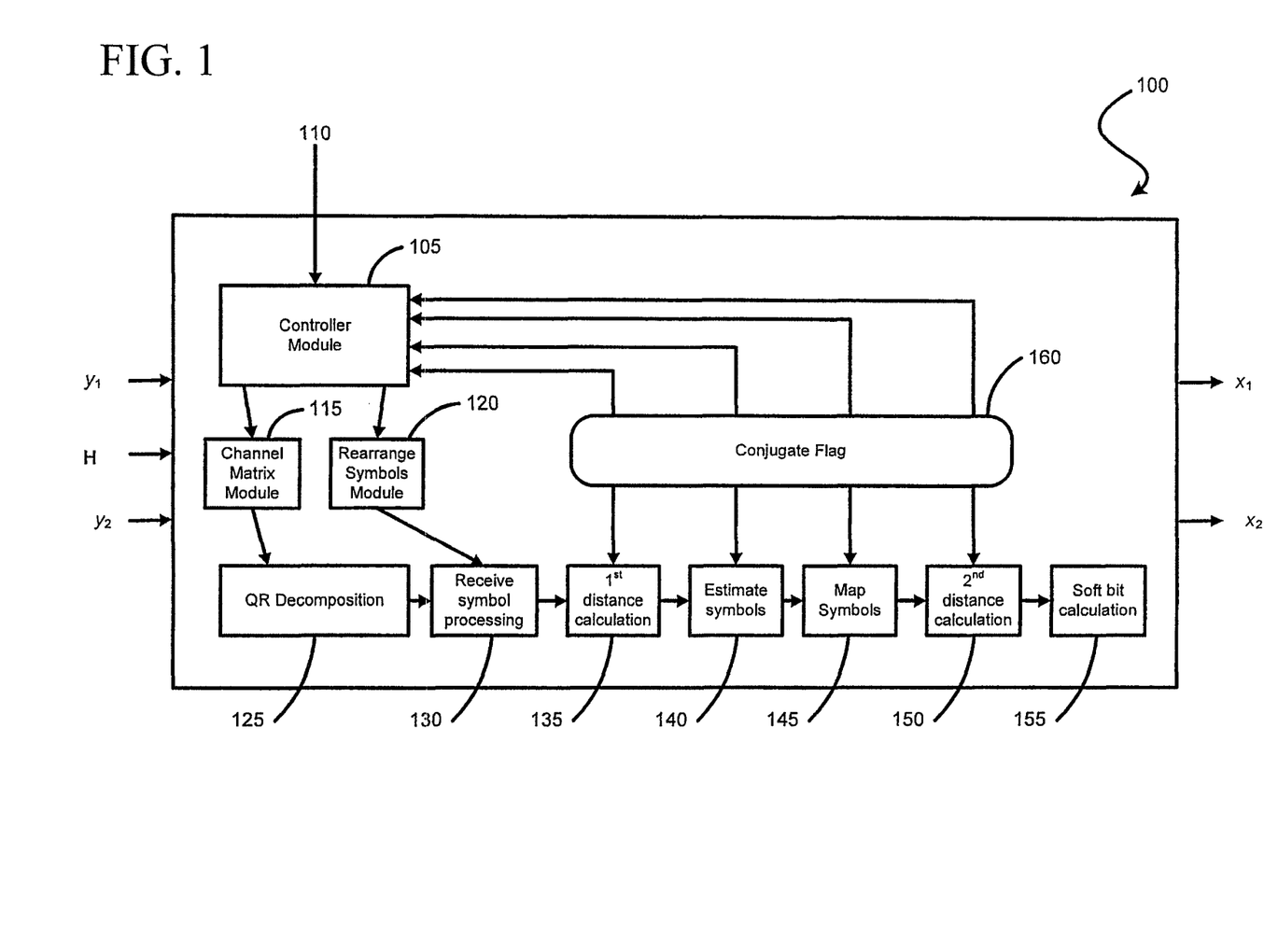
FIG. 1 is a block diagram of the components of the QR-MLD demodulator according to an embodiment of the invention.

Referring now to FIG. 1, there is shown a QR-MLD demodulator 100 which has a number of inputs including received data I/Q on a first receiver $y_1$ and a second receiver $y_2$, a channel matrix H for channel estimation, a mode 110 associated with the each of the received data on first receiver $y_1$ and second receiver $y_2$. The QR-MLD demodulator 100 has a number of modules within it so as to provide an output of demodulated soft bits on two output streams $x_1$ and $x_2$.

The modules within the QR-MLD demodulator 100 include a controller module 105 which determines the transmission reception mode from the received data on first receiver $y_1$ and second receiver $y_2$ as being one of SISO, SIMO, MIMO or SFBC. The controller module 105 does this by taking the input from the mode 110 associated with the received data on first receiver $y_1$ and second receiver $y_2$. Once the mode 110 is determined, the controller module 105 passes control to the channel matrix module 115 and rearrange symbol module 120 each of which takes the channel estimates and received symbols produced from the received data on first receiver $y_1$ and second receiver $y_2$ and rearranges them so that the appropriate transmitted symbol can be demodulated. The channel matrix module 115 constructs and outputs a 4×2 channel matrix H and the rearrange symbol module 120 constructs and outputs a 4×1 received symbol vector y. The 4×2 channel matrix H output from channel matrix module 115 is then fed to into the QR decomposition module 125. The 4×1 received symbol vector y output from rearrange symbol module 120 is fed into receive symbol processing module 130. The QR decomposition module 125 then performs QR decomposition on the channel matrix H provided by the output of channel matrix module 115 to provide a unitary Q matrix and upper triangular matrix R for use in the receive symbol processing module 130. The receive symbol processing module 130 multiplies the constructed receive symbol vector y (received from rearrange symbol module 120) by the Hermitian of the Q matrix provided by the QR decomposition module 125 to provide a processed received symbol vector z for use in the other modules. First distance calculation module 135 checks, via the controller module 105, the mode 110 of the received data and if the mode is SFBC it also checks if a conjugate calculation is required and sets a flag 160. First distance calculation module 135 then calculates the Euclidean distance for all possible constellation symbols by performing either a conjugate calculation or a non conjugate calculation depending in the value of the flag 160. Following that, the estimate symbols module 140 checks via the flag 160 if either a conjugate calculation or a non conjugate calculation is required and then estimates the symbol transmitted from the adjacent stream given a symbol from the constellation set. Control then moves to the map symbols module 145 which maps the estimated symbol to the nearest symbol in the constellation set. Map symbols module 145 need not check flag 160 but may be in communication with controller module 105 as required. The second distance calculation module 150 determines via the flag 160 if a either a conjugate calculation or a non conjugate calculation is required and then calculates the distance using the mapped symbol from the map symbols module 145 and all possible symbols from the constellation set. Second distance calculation module 150 then sums the output of first distance calculation module 135 and the result of the second distance calculation to output a total distance calculation to the soft bit calculation module 155. The soft bit calculation module 155 determines for each bit position, the minimum distance where the bit is 1 and 0 and subtracts the two to calculate the soft bits. Finally, an output of demodulated soft bits on two output streams $x_1$ and $x_2$ is provided.

Figure 2A:
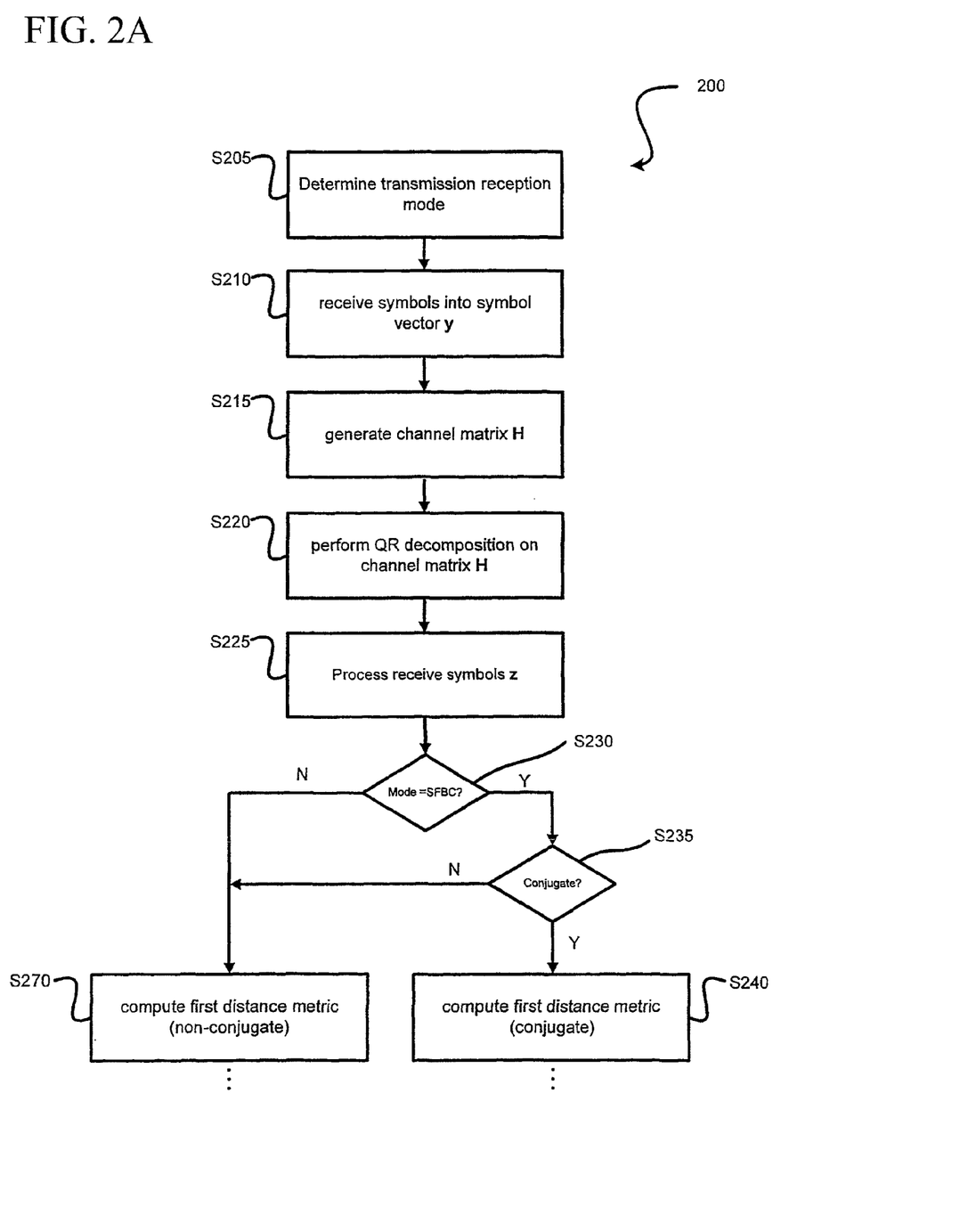
FIGS. 2A and 2B are flow diagrams showing the steps in the method of the invention.
Figure 2B:
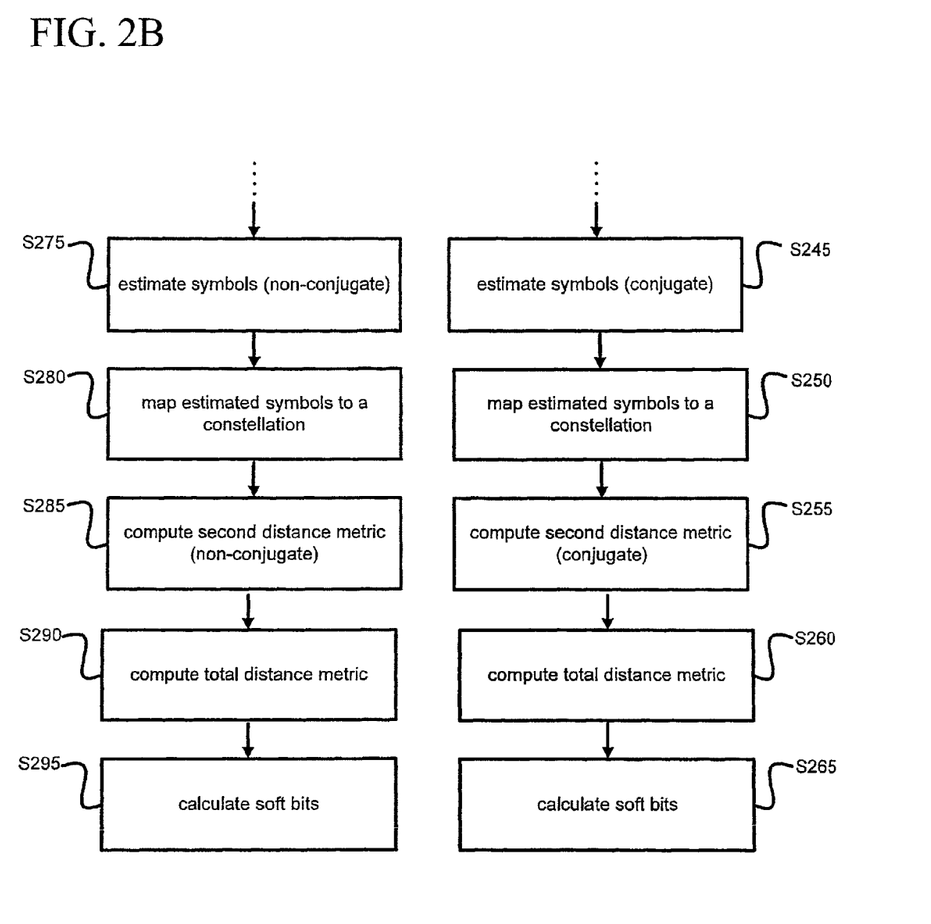

FIGS. 2A and 2B show the method 200 carried out by each of the modules in the QR MLD demodulator 100 of FIG. 1.

At step 205, the transmission reception mode of the received data is determined as being one of SISO, SIMO, MIMO or SFBC. Advantageously, determining the transmission reception mode allows for the method of the present invention to have the same steps for all transmission reception modes. Advantageously, this results in a less complex QR-MLD demodulator. At step 210 symbols are received simultaneously via multiple streams (such as $y_1$ and $y_2$ in FIG. 1) and the simultaneously received symbols are represented by a received symbol vector y. At step 215 a channel matrix H is generated. In steps 210 and 215, an appropriate matrix is constructed for QR decomposition in step 220, but the channel matrix construction and receive vector construction will vary depending on the transmission reception mode. In general, the output of steps 210 and 215 will be a 4×2 channel matrix H and a 4×1 received symbol vector y. A controller module 105 (such as that shown in FIG. 1) may provide the appropriate channel estimates and received symbols. Table 1 below indicates the mode and corresponding channel matrix construction H and received vector construction y for each of the possible modes. The function $h_{m,n}(f)$ denotes the channel between transmit antenna n and receive antenna m of the f-th frequency tone.

TABLE 1

Channel matrix construction for each mode

| Mode | Channel matrix construction H | Received vector construction y |
|---|---|---|
| 2 × 2 MIMO for demodulating symbol transmitted from the first antenna | $\begin{bmatrix} h_{2,2}(f) & h_{2,1}(f) \\ h_{1,2}(f) & h_{1,1}(f) \\ 0 & 0 \\ 0 & 0 \end{bmatrix}$ | $\begin{bmatrix} y_2 \\ y_1 \\ 0 \\ 0 \end{bmatrix}$ |
| 2 × 2 MIMO for demodulating symbol transmitted from the second antenna | $\begin{bmatrix} h_{1,1}(f) & h_{1,2}(f) \\ h_{2,1}(f) & h_{2,2}(f) \\ 0 & 0 \\ 0 & 0 \end{bmatrix}$ | $\begin{bmatrix} y_1 \\ y_2 \\ 0 \\ 0 \end{bmatrix}$ |
| 1 × 1 SISO | $\begin{bmatrix} h_{1,1}(f) & 0 \\ 0 & h_{1,1}(f) \\ 0 & 0 \\ 0 & 0 \end{bmatrix}$ | $\begin{bmatrix} y_1(f) \\ y_1(f) \\ 0 \\ 0 \end{bmatrix}$ |
| 2 × 1 Rx diversity | $\begin{bmatrix} h_{1,1} & 0 \\ 0 & h_{1,1} \\ h_{2,1} & 0 \\ 0 & h_{2,1} \end{bmatrix}$ | $\begin{bmatrix} y_1(f) \\ y_1(f) \\ y_2(f) \\ y_2(f) \end{bmatrix}$ |
| 2 × 1 SFBC for demodulating the symbol transmitted on the first frequency tone | $\begin{bmatrix} h_{1,1}^*(f+1) & h_{1,2}^*(f+1) \\ -h_{1,2}(f) & h_{1,1}(f) \\ 0 & 0 \\ 0 & 0 \end{bmatrix}$ | $\begin{bmatrix} y_1^*(f+1) \\ y_1(f) \\ 0 \\ 0 \end{bmatrix}$ |
| 2 × 1 SFBC for demodulating the symbol transmitted on the second frequency tone | $\begin{bmatrix} h_{1,1}(f) & -h_{1,2}(f) \\ h_{1,2}^*(f+1) & h_{1,1}^*(f+1) \\ 0 & 0 \\ 0 & 0 \end{bmatrix}$ | $\begin{bmatrix} y_1(f) \\ y_1^*(f+1) \\ 0 \\ 0 \end{bmatrix}$ |
| 2 × 2 SFBC for demodulating the symbol transmitted on the first frequency tone | $\begin{bmatrix} h_{1,1}^*(f+1) & h_{1,2}^*(f+1) \\ -h_{1,2}(f) & h_{1,1}(f) \\ h_{2,1}^*(f+1) & h_{2,2}^*(f+1) \\ -h_{2,2}(f) & h_{2,1}(f) \end{bmatrix}$ | $\begin{bmatrix} y_1^*(f+1) \\ y_1(f) \\ y_2^*(f+1) \\ y_2(f) \end{bmatrix}$ |
| 2 × 2 SFBC for demodulating the symbol transmitted on the second frequency tone | $\begin{bmatrix} h_{1,1}(f) & -h_{1,2}(f) \\ h_{1,2}^*(f+1) & h_{1,1}^*(f+1) \\ h_{2,1}(f) & -h_{2,2}(f) \\ h_{2,2}^*(f+1) & h_{2,1}^*(f+1) \end{bmatrix}$ | $\begin{bmatrix} y_1(f) \\ y_1^*(f+1) \\ y_2(f) \\ y_2^*(f+1) \end{bmatrix}$ |
| 4 × 1 SFBC for demodulating the symbol transmitted on the first frequency tone | $\begin{bmatrix} h_{1,1}^*(f+1) & h_{1,3}^*(f+1) \\ -h_{1,3}(f) & h_{1,1}(f) \\ 0 & 0 \\ 0 & 0 \end{bmatrix}$ | $\begin{bmatrix} y_1^*(f+1) \\ y_1(f) \\ 0 \\ 0 \end{bmatrix}$ |
| 4 × 1 SFBC for demodulating the symbol transmitted on the second frequency tone | $\begin{bmatrix} h_{1,1}(f) & -h_{1,3}(f) \\ h_{1,3}^*(f+1) & h_{1,1}^*(f+1) \\ 0 & 0 \\ 0 & 0 \end{bmatrix}$ | $\begin{bmatrix} y_1(f) \\ y_1^*(f+1) \\ 0 \\ 0 \end{bmatrix}$ |
| 4 × 1 SFBC for demodulating the symbol transmitted on the third frequency tone | $\begin{bmatrix} h_{1,2}^*(f+3) & h_{1,4}^*(f+3) \\ -h_{1,4}(f+2) & h_{1,2}(f+2) \\ 0 & 0 \\ 0 & 0 \end{bmatrix}$ | $\begin{bmatrix} y_1^*(f+3) \\ y_1(f+2) \\ 0 \\ 0 \end{bmatrix}$ |
| 4 × 1 SFBC for demodulating the symbol transmitted on the fourth frequency tone | $\begin{bmatrix} h_{1,2}(f+2) & -h_{1,4}(f+2) \\ h_{1,4}^*(f+3) & h_{1,2}^*(f+3) \\ 0 & 0 \\ 0 & 0 \end{bmatrix}$ | $\begin{bmatrix} y_1(f+2) \\ y_1^*(f+3) \\ 0 \\ 0 \end{bmatrix}$ |
| 4 × 2 SFBC for demodulating the symbol transmitted on the first frequency tone | $\begin{bmatrix} h_{1,1}^*(f+1) & h_{1,3}^*(f+1) \\ -h_{1,3}(f) & h_{1,1}(f) \\ h_{2,1}^*(f+1) & h_{2,3}^*(f+1) \\ -h_{2,3}(f) & h_{2,1}(f) \end{bmatrix}$ | $\begin{bmatrix} y_1^*(f+1) \\ y_1(f) \\ y_2^*(f+1) \\ y_2(f) \end{bmatrix}$ |
| 4 × 2 SFBC for demodulating the symbol transmitted on the second frequency tone | $\begin{bmatrix} h_{1,1}(f) & -h_{1,3}(f) \\ h_{1,3}^*(f+1) & h_{1,1}^*(f+1) \\ h_{2,1}(f) & -h_{2,3}(f) \\ h_{2,3}^*(f+1) & h_{2,1}^*(f+1) \end{bmatrix}$ | $\begin{bmatrix} y_1(f) \\ y_1^*(f+1) \\ y_2(f) \\ y_2^*(f+1) \end{bmatrix}$ |
| 4 × 2 SFBC for demodulating the symbol transmitted on the third frequency tone | $\begin{bmatrix} h_{1,2}^*(f+3) & h_{1,4}^*(f+3) \\ -h_{1,4}(f+2) & h_{1,2}(f+2) \\ h_{2,2}^*(f+3) & h_{2,4}^*(f+3) \\ -h_{2,4}(f+2) & h_{2,2}(f+2) \end{bmatrix}$ | $\begin{bmatrix} y_1^*(f+3) \\ y_1(f+2) \\ y_2^*(f+3) \\ y_2(f+2) \end{bmatrix}$ |
| 4 × 2 SFBC for demodulating the symbol transmitted on the fourth frequency tone | $\begin{bmatrix} h_{1,2}(f+2) & -h_{1,4}(f+2) \\ h_{1,4}^*(f+3) & h_{1,2}^*(f+3) \\ h_{2,2}(f+2) & -h_{2,4}(f+2) \\ h_{2,4}^*(f+3) & h_{2,2}^*(f+3) \end{bmatrix}$ | $\begin{bmatrix} y_1(f+2) \\ y_1^*(f+3) \\ y_2(f+2) \\ y_2^*(f+3) \end{bmatrix}$ |

At step 220, using the channel matrix H and received symbol vector y, a QR decomposition is performed on the channel matrix H to compute a Q matrix and an R matrix such that H=QR, where the Q matrix is a unitary matrix and the R matrix is an upper triangular matrix. Assuming the constructed channel matrix H is 4×2, then Q is 4×2 and R is 2×2.

Control then moves to step 225 where the received symbol vector y is processed by multiplying the received symbol vector y by the Hermitian $Q^H$ of the Q matrix such that $z=Q_H y$ where z is the processed received symbol vector. At step 230 the transmission reception mode as determined at step 205 is checked (via the controller module 105 of FIG. 1 for example) and if the mode is SFBC then control moves to step 235 where a determination is made as to whether a conjugate calculation is required. If at step 230 the mode does not equal SFBC, then the mode must be one of SISO, SIMO or MIMO and control moves to step 270 as will be described further below. Step 235 determines whether a conjugate calculation will be required and conjugate flag 160 having either a true or false value is recorded via the controller module 105. The conjugate flag 160 is set using the following rule:

if the mode at step 205=SFBC and f is odd, then the conjugate flag 160 equals true otherwise the conjugate flag 160 equals false. In the above rule, $f=(0, f_{max})$ is the frequency tone index ranging from 0 to $f_{max}-1$. If at step 235, via the above rule, it is determined that the calculation required is a conjugate calculation, then control moves to step 240. Alternatively, if it is determined that a non-conjugate calculation will be required then control moves to step 270 and the calculations from that point onwards are the same for any of SISO, SIMO or MIMO.

At step 240 a first distance matrix $d_{1,j}$ is determined by using the processed received symbol vector z from step 225 and the R matrix of the QR decomposition at step 220 and performing a conjugate first distance matrix calculation. The conjugate first distance matrix calculation is calculated from the expression $d_{1,j}=|z_2-r_{2,2}c_j^*|^2$ where $c_j$ is a symbol drawn from a constellation set. The constellation set may be any constellation set commonly used in wireless communications, including BPSK, QPSK, 8-PSK, 16QAM and 64QAM.

At step 245 the estimated symbol $\hat{x}_j$ is computed by performing a conjugate estimated symbol calculation from the expression $$\hat{x}_j = \frac{z_1 - r_{1,2}c_j^*}{r_{1,1}}.$$

At step 250 the estimated symbol is mapped to a constellation as $\hat{x}_{map,j}$.

The mapping of step 250 can vary depending on methods of implementation as is known in the art. It will be appreciated that any mapping method could be used with the present invention. For example, a simple method would be to determine ranges where each symbol in the constellation would lie and use these ranges to map the symbol. Taking QPSK as an example, one symbol is contained in each quadrant of a constellation diagram. Therefore the real and imaginary components of $\hat{x}_j$ can be evaluated to determine which constellation symbol most closely matches the estimated one. If, for example the estimated symbol has real and imaginary components that are greater than 0, the mapped symbol will be the one in the first quadrant (1+1 j). For 16-QAM and 64QAM constellation sets, the 'slicing' points can be refined.

An alternative mapping method known in the art includes detecting the quadrant of a constellation diagram where each symbol lies and iteratively shifting the origin of the quadrant to lie in the middle of the previously detected quadrant. Then, based on the final quadrant position, the symbols can be mapped. This method of symbol mapping lends itself more readily to QAM constellations (where phase and amplitude are varied).

At step 255 a second distance metric $d_{2,j}$ is computed by performing a conjugate second distance metric calculation via the expression $d_{2,j}=|z_1-r_{1,1}\hat{x}_{map,j}-r_{1,2}c_j^*|^2$.

At step 260 a total distance metric $d_{total,j}$ is computed by summing the results of the first distance metric $d_{1,j}$ and second distance metric $d_{2,j}$ which were calculated in step 240 and 255 and given by the expression $d_{total,j}=d_{1,j}+d_{2,j}$.

Control then moves to step 265 where the soft bits are determined by:

calculating the minimum distance from the symbols in the constellation that have a 1 in the i-th bit position (denoted $B_i^1$) from the expression $$d_{min,i}(B_i^1) = \min_{j \in B_i^1}(d_{total,j});$$

calculating the minimum distance from the symbols in the constellation that have an 0 in the i-th bit position (denoted $B_i^0$) from the expression $$d_{min,i}(B_i^0) = \min_{j \in B_i^0}(d_{total,j});$$

and
calculating the two minimum distances from the expression $$\hat{b}_i = d_{min,i}(B_i^1) - d_{min,i}(B_i^0).$$

If at step 230 the mode did not equal SFBC and was any one of SISO, SIMO or MIMO, control moves to step 270 rather than step 240 because non-conjugate calculations can be carried out. Further, at step 235 even if it was determined at step 230 that the mode was SFBC, provided a conjugate calculation is not required for the SFBC mode, control also moves to step 270. At step 270 the first distance metric $d_{1,j}$ is computed by using the processed received symbol vector z and the R matrix of the QR decomposition at step 220 and performing a non-conjugate first distance metric calculation from the expression $d_{1,j}=|z_1-r_{2,2}c_j|^2$ where $c_j$ is a symbol drawn from a constellation set. The constellation set may include any constellation set commonly used in wireless communications, including BPSK, QPSK, 8-PSK, 16QAM or 64QAM.

At step 275 the estimated symbol $\hat{x}_j$ is computed by performing a non-conjugate estimated symbol calculation from the expression $$\hat{x}_j = \frac{z_1 - r_{1,2}c_j}{r_{1,1}}.$$

At step 280, the estimated symbols are mapped to a constellation as $\hat{x}_{map,j}$.

At step 285 a second distance metric $d_{2,j}$ is computed by performing a non-conjugate second distance metric calculation from the expression $$d_{2,j}=|z_1-r_{1,1}\hat{x}_{map,j}-r_{1,2}c_j|^2.$$

At step 290 the total distance metric $d_{total,j}$ is computed by summing the first and second distance metrics which were calculated at steps 270 and 285.

Finally, at step 295, the soft bits are determined in the same way as step 265 above.

Advantageously the method of the present can detect and demodulate symbols transmitted using SISO, SIMO, SFBC and MIMO modes which not only uses the same functional modules in each mode as shown in FIG. 1, the method steps do not differ between the SISO/SIMO modes and the SFBC/MIMO modes. Advantageously, all modes can be processed using the same method, save for determining whether a conjugate calculation need be computed or not, which thereby reduces hardware implementation complexity. In a further advantage, this reduced hardware implementation complexity may afford a reduction in chip size.

Although the exemplary embodiments of the invention have been disclosed for illustrative purposes, those skilled in the art will appreciate that various modifications, additions and substitutions are possible without departing from the scope of the present invention. Therefore, the present invention is not limited to the above-described embodiments but is defined by the following claims.

INDUSTRIAL APPLICABILITY

The present invention can be used in demodulating date transmitted over wireless communications systems to facilitate demodulation of data transmitted via a number of different communication modes.

The invention claimed is:

1. A method for QR-maximum likelihood detection (QR-MLD) demodulation, including the steps of:
   (a) determining a transmission reception mode as being one of single input—single output (SISO), single input—multiple output (SIMO), multiple input—multiple output (MIMO) or space frequency block codes (SFBC);
   (b) receiving symbols simultaneously via multiple streams, the simultaneously received symbols being represented by a received symbol vector y;
   (c) generating a channel matrix H;
   (d) performing QR decomposition on the channel matrix H to compute a Q matrix and an R matrix such that H=QR, the Q matrix being a unitary matrix and the R matrix being an upper triangular matrix;
   (e) processing the received symbol vector y by multiplying the received symbol vector y by the Hermitian $Q^H$ of the Q matrix such that $z=Q^H y$ where z is the processed received symbol vector;
   (f) determining, for a SFBC mode determined at step (a), whether a conjugate calculation will be required and setting a conjugate flag having either a true or false value;
   (g) computing a first distance metric $d_{1,j}$ by using the processed received symbol vector z and the R matrix of the QR decomposition and performing a conjugate first distance metric calculation if the conjugate flag is true, else performing a non-conjugate first distance metric calculation if the conjugate flag is false;
   (h) computing an estimated symbol $\hat{x}_j$ by performing a conjugate estimated symbol calculation if the conjugate flag is true, else performing a non-conjugate estimated symbol calculation if the conjugate flag is false;
   (i) mapping the estimated symbol to a constellation as $\hat{x}_{map,j}$;
   (j) computing a second distance metric $d_{2,j}$ by performing a conjugate second distance metric calculation if the conjugate flag is true; else performing a non-conjugate second distance metric calculation if the conjugate flag is false;
   (k) computing a total distance metric $d_{total j}$ by summing the first and second distance metrics in steps (g) and (j); and
   (l) calculating the soft bits.

2. The method of claim 1, wherein at step (f), the SFBC mode includes a frequency tone index $f=(0, f_{max})$ ranging from 0 to $f_{max}$ and the conjugate flag is determined by the expression $f=(0, f_{max})$ such that the conjugate flag is set to true if f is odd and set to false otherwise.

3. The method of claim 1, wherein at step (g) the conjugate first distance metric calculation is calculated from the expression $d_{1,j}=|z_2-r_{2,2}c_j^*|^2$ where $c_j$ is a symbol drawn from a constellation set.

4. The method of claim 1, wherein at step (g) the non-conjugate first distance metric calculation is calculated from the expression $d_{1,j}=|z_2-r_{2,2}c_j|^2$ where $c_j$ is a symbol drawn from a constellation set.

5. The method of claim 3, wherein the constellation set includes any constellation set commonly used in wireless communications, including BPSK, QPSK, 8-PSK, 16QAM, 64QAM.

6. The method of claim 1, wherein at step (h) the conjugate estimated symbol calculation is calculated from the expression $$\hat{x}_j = \frac{z_1 - r_{1,2}c_j^*}{r_{1,1}}.$$

7. The method of claim 1, wherein at step (h) the non-conjugate estimated symbol calculation is calculated from the expression $$\hat{x}_j = \frac{z_1 - r_{1,2}c_j}{r_{1,1}}.$$

8. The method of claim 1, wherein at step (j) the conjugate second distance metric calculation is calculated from the expression $d_{2,j}=|z_1-r_{1,1}\hat{x}_{map,j}-r_{1,2}c_j^*|^2$.

9. The method of claim 1, wherein at step (j) the non-conjugate second distance metric calculation is calculated from the expression $d_{2,j}=|z_1-r_{1,1}\hat{x}_{map,j}-r_{1,2}c_j|^2$.

10. The method of claim 1, wherein at step (k) the total distance metric $d_{total j}$ is calculated by the expression $d_{total j}=d_{1,j}+d_{2,j}$.

11. The method of claim 1, wherein at step (l), the soft bits are calculated by:
   (m) calculating the minimum distance from the symbols in the constellation that have a 1 in the i-th bit position (denoted $B_i^1$) from the expression $$d_{min,i}(B_i^1) = \min_{j \in B_i^1}(d_{total j});$$

(n) calculating the minimum distance from the symbols in the constellation that have an 0 in the i-th bit position (denoted $B_i^0$) from the expression and $$d_{min,i}(B_i^0) = \min_{j \in B_i^0}(d_{total j});$$

and
   (o) calculating the two minimum distances from the expression
   $\hat{b}_i = d_{min,i}(B_i^1) - d_{min,i}(iB_i^0)$.

12. The method of claim 4, wherein the constellation set includes any constellation set commonly used in wireless communications, including BPSK, QPSK, 8-PSK, 16QAM, 64QAM.

* * * * *

UNITED STATES PATENT AND TRADEMARK OFFICE
CERTIFICATE OF CORRECTION

PATENT NO. : 8,442,162 B2  Page 1 of 1
APPLICATION NO. : 13/128150
DATED : May 14, 2013
INVENTOR(S) : Jiun Siew It is certified that error appears in the above-identified patent and that said Letters Patent is hereby corrected as shown below:

In the Specification

Column 8, Line 37: Delete "$d_{1,j}=|z_1-r_{2,2}c_j|^2$" and insert -- $d_{1,j}=|z_2-r_{2,2}c_j|^2$ --

In the Claims

Column 10, Line 61: In Claim 11, delete "$\hat{b}_i = d_{min,i}(B_i^1) - d_{min,i}(iB_j^0).$" and insert -- $\hat{b}_i = d_{min,i}(B_j^1) - d_{min,i}(B_j^0).$ --

Signed and Sealed this
Twenty-eighth Day of October, 2014

Michelle K. Lee
*Deputy Director of the United States Patent and Trademark Office*